US006544388B2

(12) United States Patent
Dennis, Jr.

(10) Patent No.: US 6,544,388 B2
(45) Date of Patent: Apr. 8, 2003

(54) OSCILLATING DOCTOR BLADE HOLDER

(75) Inventor: Louis E. Dennis, Jr., Paxton, MA (US)

(73) Assignee: Kadant Web Systems, Inc., Auburn, MA (US)

( * ) Notice: Subject to any disclaimer, the term of this patent is extended or adjusted under 35 U.S.C. 154(b) by 0 days.

(21) Appl. No.: 09/880,438

(22) Filed: Jun. 13, 2001

(65) Prior Publication Data

US 2002/0040774 A1 Apr. 11, 2002

Related U.S. Application Data

(63) Continuation-in-part of application No. 09/686,507, filed on Oct. 11, 2000, now abandoned.

(51) Int. Cl.[7] .......................... D21G 3/00; B65G 45/14

(52) U.S. Cl. ..................... 162/272; 162/281; 15/256.53

(58) Field of Search .......................... 162/11, 198, 199, 162/272, 281; 15/256.51, 256.53; 101/120, 157, 169, 350.6; 118/100, 107, 110, 119, 126, 261, 413; 198/497, 498, 499; 210/396; 399/284; 427/356; 134/9, 15

(56) References Cited

U.S. PATENT DOCUMENTS

| | | | | | |
|---|---|---|---|---|---|
| 728,354 | A | * | 5/1903 | Bauer | 15/236.05 |
| 2,300,908 | A | * | 11/1942 | Broughton | 15/256.53 |
| 2,728,103 | A | * | 12/1955 | Benedict et al. | 425/320 |
| 3,404,424 | A | * | 10/1968 | Drayton | 15/308 |
| 3,633,232 | A | * | 1/1972 | McCullough | 15/93.2 |
| 4,042,364 | A | * | 8/1977 | King et al. | 65/168 |
| 4,389,936 | A | * | 6/1983 | Jaffa et al. | 101/123 |
| 4,397,238 | A | * | 8/1983 | Westerkamp | 101/367 |

* cited by examiner

*Primary Examiner*—Steven P. Griffin
*Assistant Examiner*—Eric Hug
(74) *Attorney, Agent, or Firm*—Samuels, Gauthier & Stevens LLP

(57) ABSTRACT

An apparatus for doctoring a moving surface includes a blade holder component extending longitudinally across the moving surface and carrying a doctor blade. A support component is parallel to and supports the blade holder component. A first operating mechanism rotatably urges the doctor blade in a doctoring direction into contact with the moving surface, resulting in the doctor blade being acted upon by a reactionary thrust force in the plane of the doctor blade and a reactionary rotational force in a direction opposite to the doctoring direction. A pair of mutually opposed parallel guide rails are provided on one of the components, and rotatable rollers are spaced along the length of the other of the component. The rollers are in rolling contact and in mechanical interengagement with the guide rails to accommodate reciprocal movement of the blade holder component relative to the support component, and to resist both the reactionary thrust force and the reactionary rotational force acting on the doctor blade. A second operating mechanism reciprocally moves the blade holder component relative to the support component.

25 Claims, 7 Drawing Sheets

OSCILLATING DOCTOR BLADE HOLDER

CROSS REFERENCE TO RELATED APPLICATION

This is a continuation-in-part of U.S. patent application Ser. No. 09/686,507 filed Oct. 11, 2000, now abandoned.

BACKGROUND OF THE INVENTION

1. Field of the Invention

This invention relates generally to doctors of the type employed in paper making machines and the like, and is concerned in particular with an improved oscillating doctor blade holder.

2. Description of the Prior Art

In a known doctor, as disclosed in U.S. Pat. No. 2,300,908 (Broughton), an unduly complex roller arrangement is employed to reciprocally support and guide the blade holder. In particular, mutually spaced sets of at least three rollers are required to act in concert to counteract the reactionary thrust and rotational forces exerted on the doctor blade holder during a doctoring operation.

Such arrangements are difficult to maintain, often requiring disassembly of the blade holder when roller replacement becomes necessary. The three roller arrangement is also difficult to seal and thus prone to a build up of contaminants between the roller sets. This in turn requires frequent cleaning and attention by maintenance personnel.

SUMMARY OF THE INVENTION

An objective of the present invention is to overcome the disadvantages of known oscillating doctor holders by providing a much simpler yet highly effective support arrangement.

To this end, in accordance with the present invention, a blade holder component extends longitudinally across a moving surface to be doctored. A doctor blade is carried by the blade holder component. A support component is parallel to and supports the blade holder component. A first operating means rotatably urges the doctor blade in one direction into contact with the moving surface to be doctored, resulting in the doctor blade being acted upon by a reactionary thrust force in the plane of the doctor blade, and a reactionary rotational force opposite to the direction of rotational blade application.

Guide rails on parallel tracks are provided on one of either the blade holder or support components, and rotatable rollers are spaced along the length of the other of the blade holder or support components. Each roller is in rolling contact with a guide rail on a respective one but not the other of the tracks to thereby accommodate reciprocal movement of the blade holder component relative to the support component, and at least some of the rollers coact with their respective guide rails to resist both the reactionary thrust and rotational forces acting on the doctor blade.

A second operating means reciprocally moves the blade holder component relative to the support component.

In certain preferred embodiments, the rollers have either curved or angularly profiled rims in rolling contact and in mechanical interengagement with mating curved or angularly disposed surfaces on the guide rails. The curved or angularly disposed surfaces of the guide rails may define longitudinal grooves extending in the direction of reciprocal movement of the blade holder component, with the curved or angularly profiled rims of the rollers projecting into the longitudinal grooves. Alternatively, the curved or angularly profiled rims of the rollers may define circular grooves, with the curved or angularly disposed surfaces of the guide rails projecting into the circular grooves.

The rollers may advantageously be grouped in pairs mounted on and spaced at intervals along the length of either the blade holder component or the support component. The rotational axes of the roller pairs may be offset in the direction of the length of the component on which they are mounted.

The rollers are preferably axially shiftable on their respective support shafts to thereby accommodate any minor misalignment and/or subsequent gradual wear of components.

These and other features, advantages and objectives of the present invention will now be described in greater detail with reference to the accompanying drawings, wherein:

DETAILED DESCRIPTION OF PREFERRED EMBODIMENTS

Figure 1:
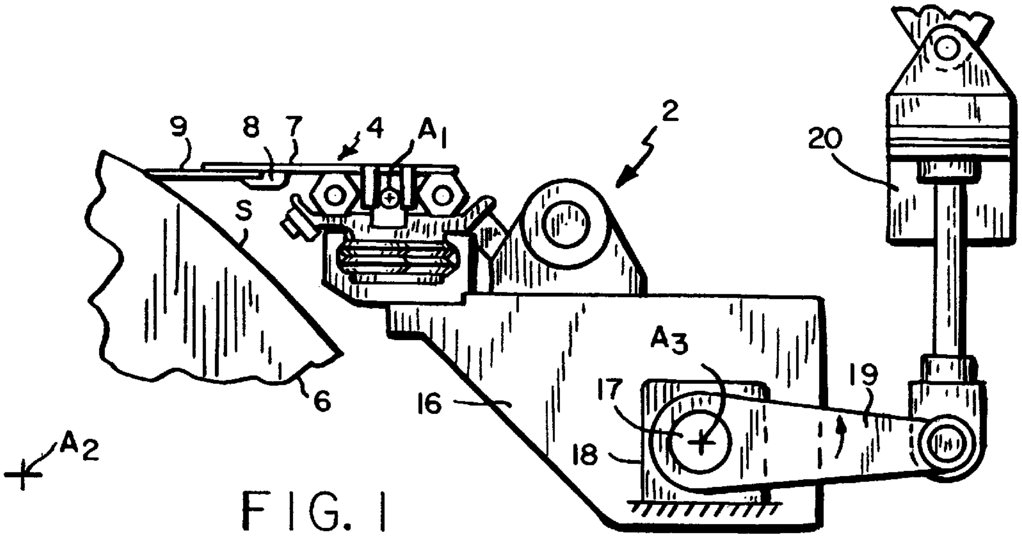
FIG. 1 is a side elevational view of one embodiment of a doctoring apparatus in accordance with one embodiment of the present invention.
Figure 2:
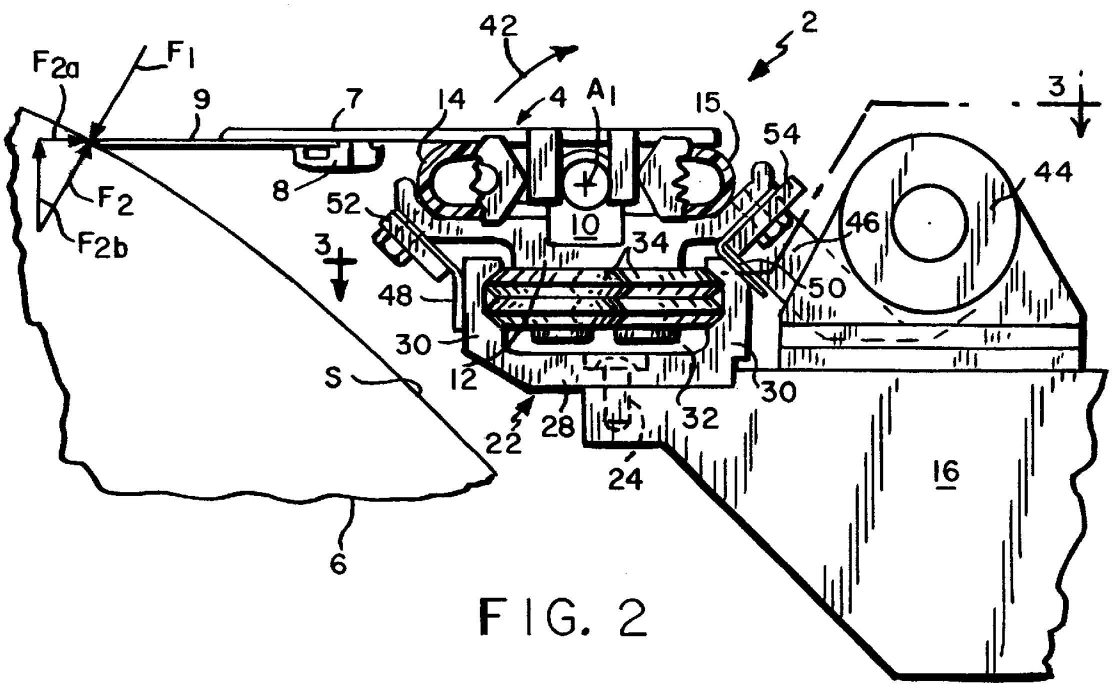
FIG. 2 is an enlarged view of a portion of the doctoring apparatus shown in FIG. 1, with portions broken away to show the fluid actuated tubes employed to control rotational adjustment of the doctor blade.
Figure 3:
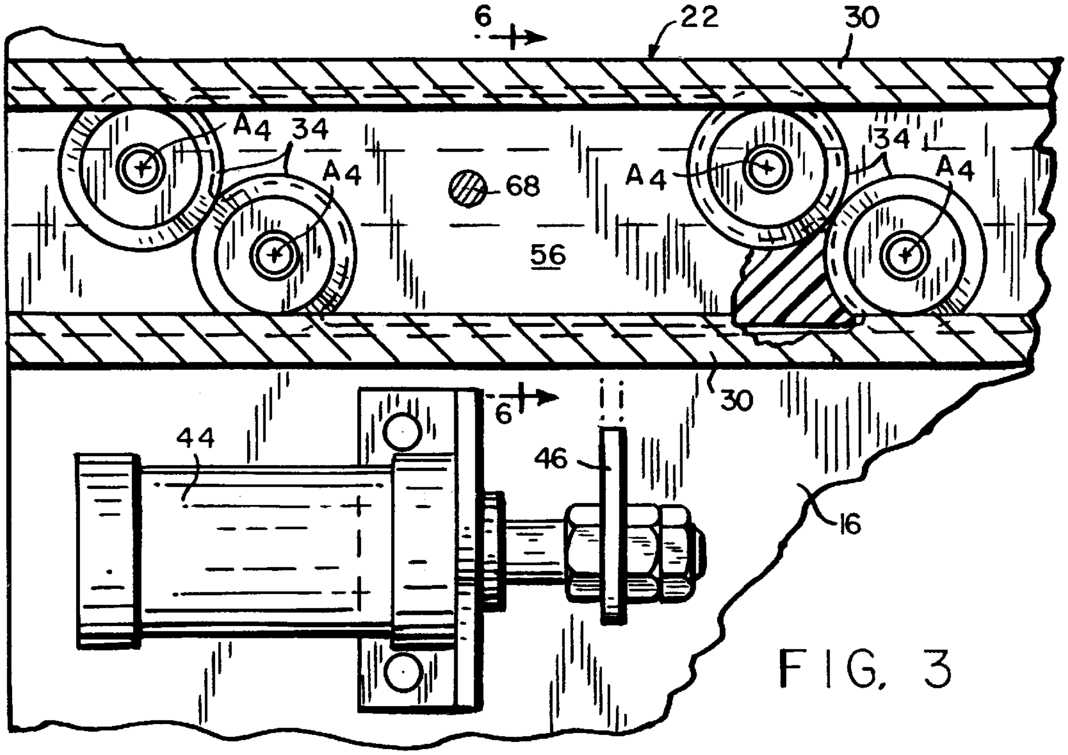
FIG. 3 is a sectional view taken generally along line 3—3 of FIG. 2.

With reference initially to FIGS. 1–3, a doctoring apparatus in accordance with one embodiment of the present invention is shown at 2 comprising a blade holder component 4 extending longitudinally across a moving surface to be doctored, in this case the surface S of a roll 6 of the type typically found in a paper making machine. The blade holder component includes a top plate 7 coacting with underlying jaws 8 to slidably receive and hold a doctor blade 9. The top plate 7 is mounted on brackets 10 for rotation about an axis $A_1$ parallel to the rotational axis $A_2$ of roll 6. The brackets 10 protrude vertically from a tray-shaped bottom 12. Fluid-actuated tubes 14, 15 are carried on the bottom 12 and bear against the underside of the top plate 7 on opposite sides of the axis A1. The blade holder component is carried on a support component 16. The support component 16 may be fixed as a part of the machine frame, or it may be keyed or otherwise fixed to a shaft 17, the latter being supported by bearings 18 for rotation about an axis $A_3$ parallel to the rotational axes $A_1$ and $A_2$.

During a doctoring operation, a first operating means applies the doctor blade 9 to the surface S with a force $F_1$.

The first operating means may entail pressurization of tube 15 to rotate the top plate 7 in a counterclockwise direction about axis $A_1$. Alternatively, or in conjunction with pressurization of tube 15, a crank arm 19 may be operated by a piston-cylinder unit 20 to rotate the support component 16 in a counterclockwise direction about axis $A_3$. As shown diagrammatically in FIG. 2, a force $F_1$ applied to the roll surface by the doctor blade is opposed by an equal and opposite reactionary force $F_2$. Reactionary force $F_2$ may be resolved into a reactionary thrust force $F_{2a}$ in the plane of the doctor blade, and a reactionary rotational force $F_{2b}$ tending to rotate the doctor blade and blade holder in a clockwise direction.

A longitudinally extending base 22 is secured by means of screws 24 or the like to the support component 16. The base has a generally U-shaped cross section, with a bottom 28 and upstanding mutually opposed sides forming guide rails 30 that extend along parallel tracks and that cooperate with the bottom 28 to define a channel 32.

Pairs of guide rollers 34 project downwardly from the bottom 12 of the blade holder component 4 into the guide channel 32. As can best be seen in FIG. 3, the roller pairs are arranged at spaced intervals along the length of the blade holder component. The rotational axes "$A_4$" of the rollers of each pair are offset in the length direction of the guide channel 32. As viewed in FIG. 3, the uppermost rollers 34 of each pair contact the upper rail 30, but not the lowermost rail. By the same token, the lowermost rollers contact the lower rail, but not the upper rail.

Figure 7:
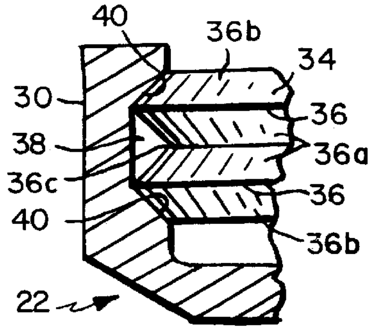
FIGS. 7 and 8 are enlarged partial sectional views of the roller and guide rail configurations shown respectively in FIGS. 2 and 4.
Figure 8:
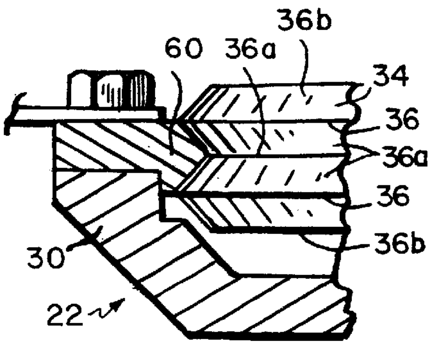

As can best be seen in FIGS. 7 and 8, the guide rollers 34 may have angularly profiled rims 36, each having inner and outer inclined shoulders 36*a*, 36*b*. The inner shoulders 36*a* coact to define a peripheral groove 36*c*. In the embodiment shown in FIGS. 2 and 7, the rims 36 project radially into grooves 38 in the side rails 30 of the track 22. The grooves 38 have angularly disposed surfaces 40. The outer shoulders 36*b* of the rims 36 are in rolling contact and in mechanical interengagement with the mating angularly disposed groove surfaces 40. The rolling contact accommodates reciprocal movement of the blade holder component 4 relative to and along the length of the track 22, and also serves to resist the reactionary thrust force $F_{2a}$. The mechanical interengagement between the rollers and rails resists the reactionary rotational force $F_{2b}$ which tends to twist the blade holder component in a clockwise direction, as indicated at 42 in FIG. 2.

Reciprocal movement may be imparted to the blade holder component 4 by a linear actuator 44 fixed to the support component 16 and joined to the blade holder component by means of a transversely extending bracket 46. The linear actuator 44 may be positioned as shown, or at any other convenient location, e.g., at an end of and in line with the blade holder component, or inside the blade holder component between spaced sets of guide rollers.

In the embodiment shown in FIG. 2 flexible sealing aprons 48, 50 are secured by keeper plates 52, 54 to the blade holder component 4. The sealing aprons frictionally contact external surfaces of the base 22 to thereby deflect external contaminants away from the guide channel 32.

Filler blocks 56 may be secured to the underside of the blade holder component 4 by means of screws 58 or the like. The filler blocks are appropriately configured to fill the spaces between the sets of guide rollers 34 and to project into and fill the grooves 38 in the rails 30. The filler blocks assist in excluding contaminants from the guide channel 32 that might penetrate past the sealing aprons 48. Additionally, the filler blocks serve as guide elements which coact with the interior surfaces of the guide rails 30 when inserting and removing the blade holder component from the support component.

Figure 4:
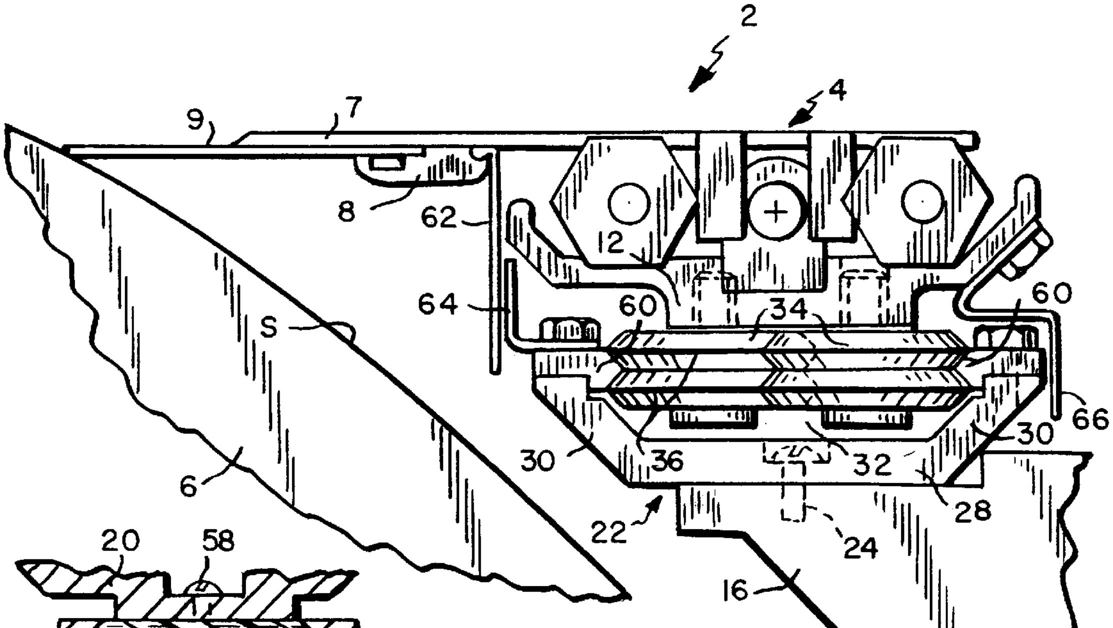
FIG. 4 is a view similar to FIG. 2 showing an alternative embodiment of a doctoring apparatus in accordance with the present invention.
Figure 6:
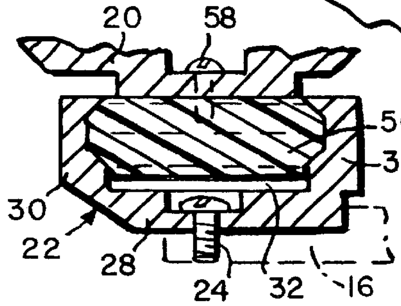
FIG. 6 is a sectional view taken along line 6—6 of FIG. 3.
Figure 5:
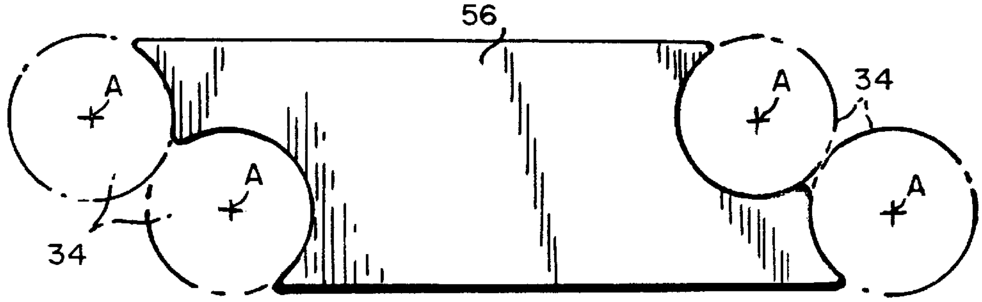
FIG. 5 diagrammatically depicts the positioning of filler blocks between successive roller sets.

In the embodiment shown in FIGS. 4 and 8, the rails 30 have V-shaped ledges 60 which project into the peripheral grooves 36*c* of the guide rollers. The inner shoulders 36*a* of the profiled roller rims 36 coact with the inclined surfaces of the guide tracks 60 in both rolling contact and in mechanical interengagement. In much the same manner as described previously with respect to the embodiment shown in FIGS. 1 and 6, rolling contact accommodates reciprocal movement of the blade holder component relative to and along the length of the track 22 while also serving to resist the reactionary thrust force $F_{2a}$. The mechanical interengagement resists the reactionary rotational force $F_{2b}$.

It the embodiment of FIG. 4, one side of the blade holder is provided with sealing plates 62, 64 configured to establish a sealing labyrinth. The opposite side of the blade holder has a sealing plate 66 configured to coact with external surfaces of the guide rail in providing a second sealing labyrinth. The sealing labyrinths serve to deflect and exclude contaminants from reaching the guide channel 32. The sealing plates 62, 64 66 may either be rigid or flexible.

Figure 9:
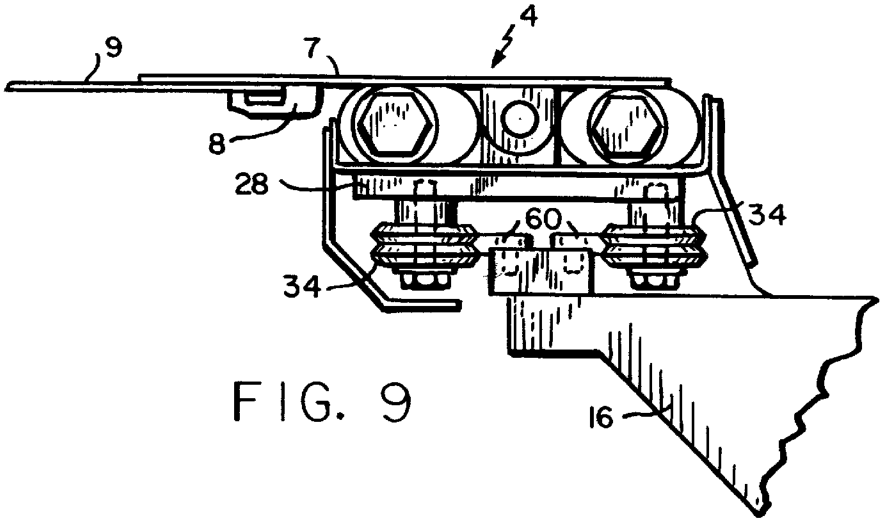
FIGS. 9–18 are views similar to FIGS. 2 and 4 showing additional alternative embodiments in accordance with the present invention.

FIGS. 9–18 illustrate other embodiments of the invention. In FIG. 9, the V-shaped ledges 60 face in opposite directions and are arranged on the doctor back component 16 between the guide rollers 34, the latter again being carried on shafts protruding downwardly from the bottom 28 of the blade holder component 24. In this arrangement, the rotational axes of the roller pairs need not be offset in the direction of reciprocal movement.

Figure 10:
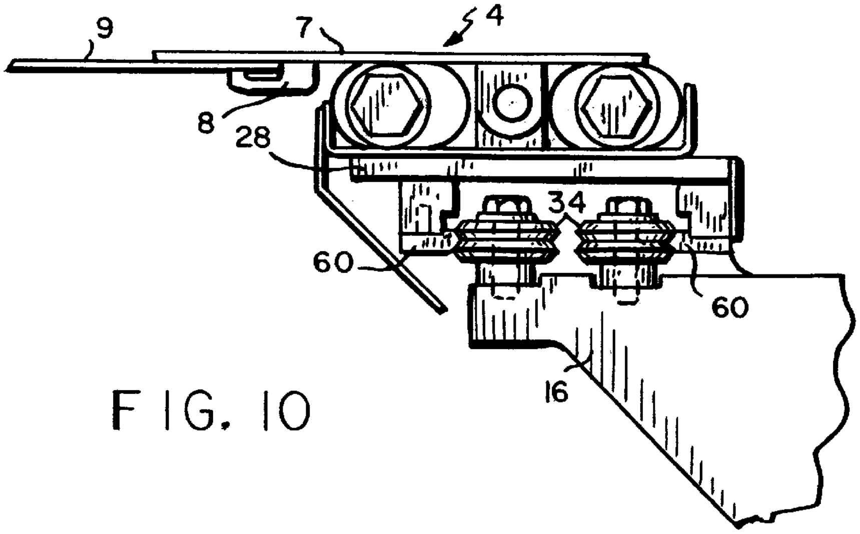

In FIG. 10, the V-shaped ledges 60 face inwardly and are mounted on brackets secured to the bottom 20 of the blade holder component. The guide rollers 34 are mounted on the support component between the ledges 60.

Figure 11:
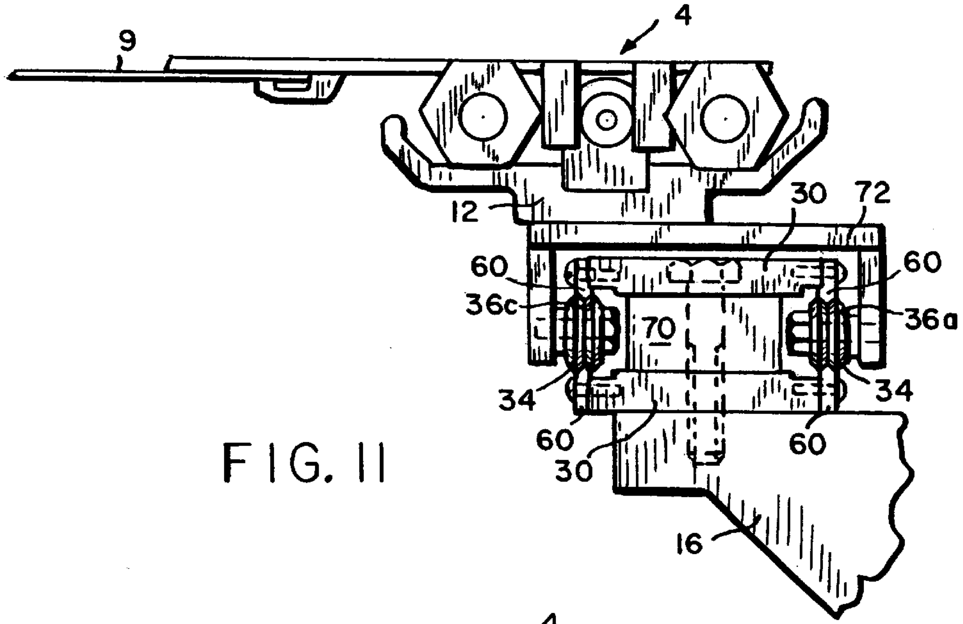

In FIG. 11, the guide rails 30 are spaced vertically one from the other by a spacer bar 70 and are secured to the support component 16. The V-shaped ledges 60 face inwardly. The guide rollers 34 are arranged between the V-shaped ledges 60 and are carried on shafts projecting from the depending sides of an inverted U-shaped bracket 72 secured to the bottom 20 of the blade holder component 4. The V-shaped ledges 60 project into and coact in rolling and mechanical interengagement with the circular peripheral grooves 36*c* of the guide rollers.

Figure 12:
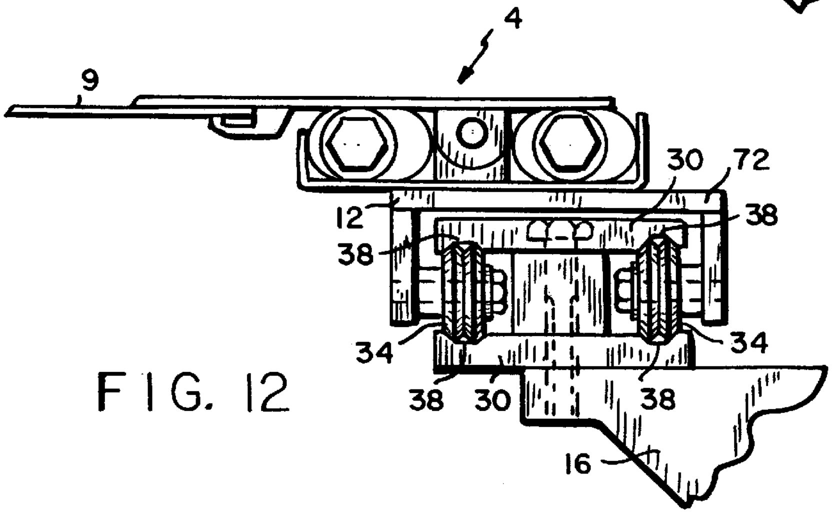

FIG. 12 is similar to FIG. 11, except that here the guide rails 30 have longitudinally extending grooves 38 into which project the angularly profiled rims of the guide rollers 34.

In the arrangements shown in FIGS. 9–11, the rolling contact and mechanical interengagement of the rollers 34 with the V-shaped ledges 60 operate as previously described with reference to FIGS. 4 and 8 in accommodating reciprocal movement of the blade holder component while resisting the reactionary thrust and rotational forces $F_{2a}$, $F_{2b}$. The arrangement shown in FIG. 12 serves the same functions and operates as described previously with respect to the arrangement shown in FIGS. 3 and 7.

Figure 13:
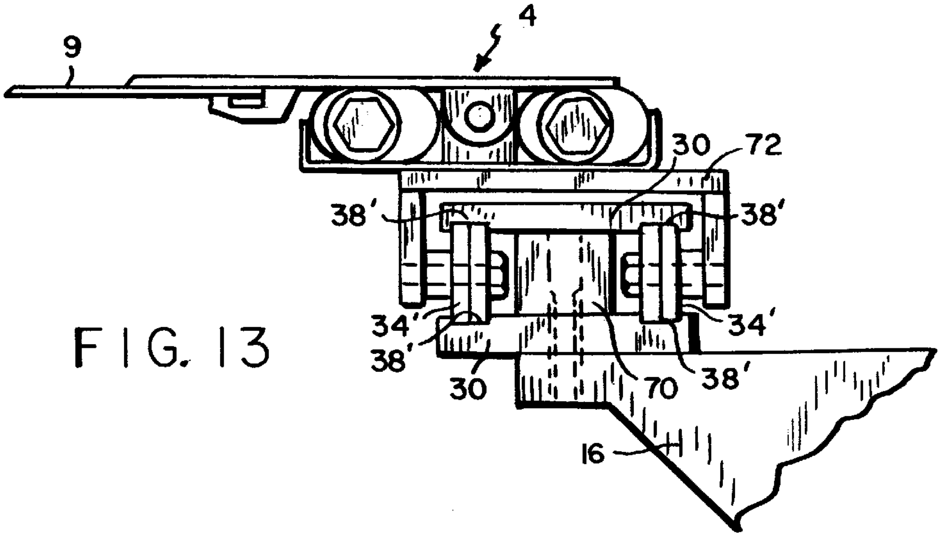

FIG. 13 is similar to FIG. 12, except that here the guide rollers 34' have cylindrical as opposed to angularly profiled peripheries which are received in flat bottomed grooves 38' in the guide rails 30. The cylindrical peripheries of the rollers 34' are in rolling contact with the bottoms of the grooves 38', and the roller of flanks are in mechanical interengagement with the edges of the grooves.

Figure 14:
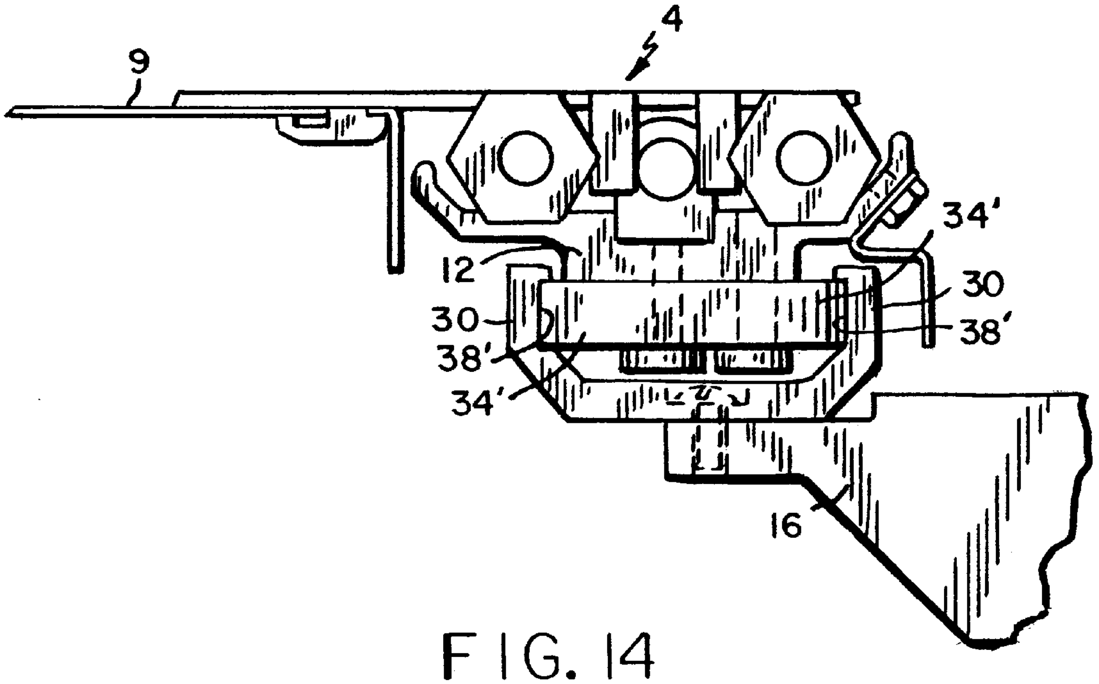

The arrangement shown in FIG. 14 is generally similar to that shown in FIG. 2, except that here again, the guide rollers 34' have cylindrical peripheries which are received in and which coact in both rolling contact and mechanical interengagement with flat bottomed grooves 38' in the guide rails 30.

Figure 15:
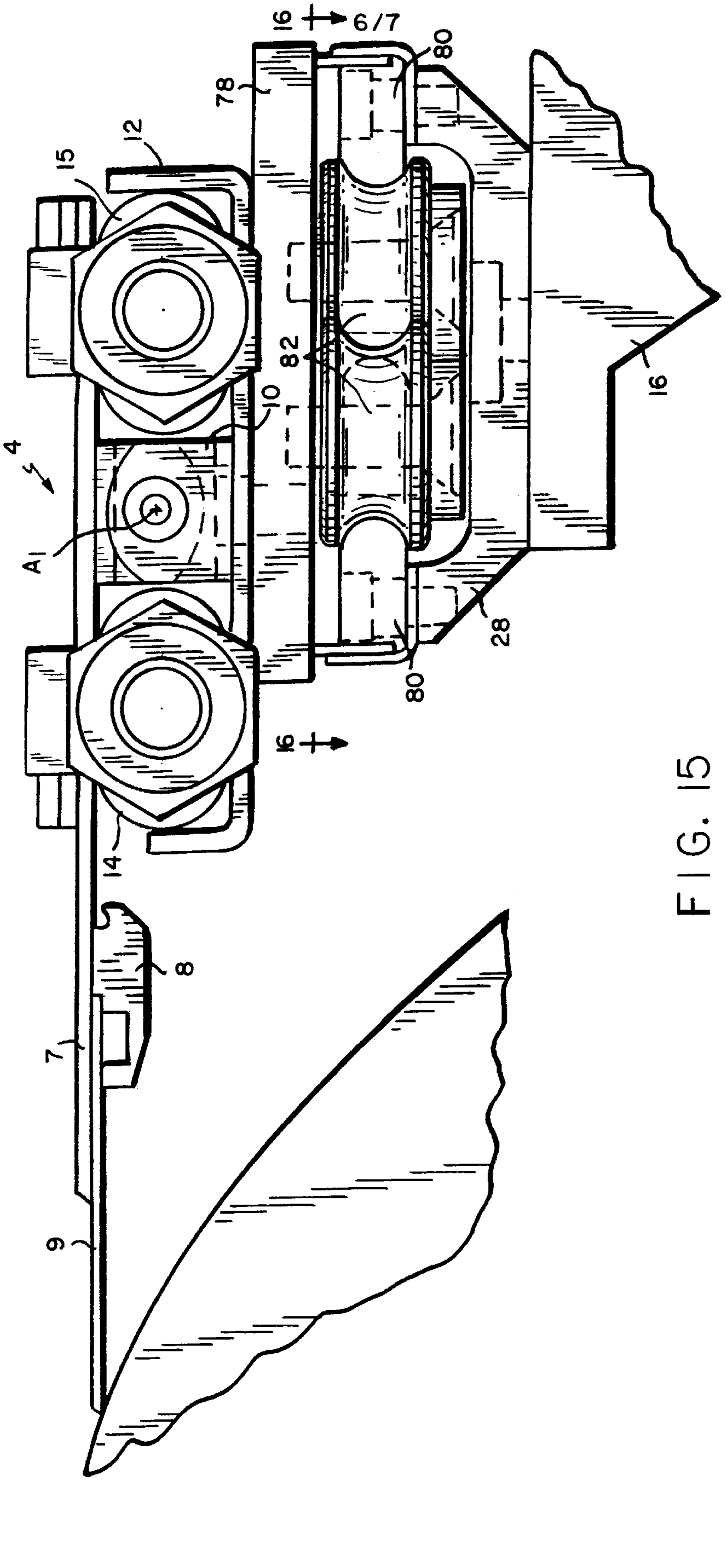
Figure 16:
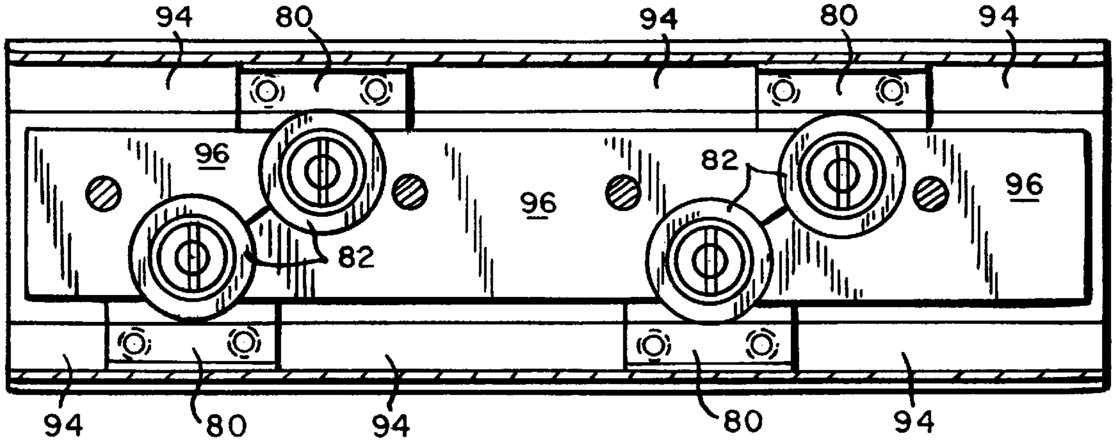
Figure 17:
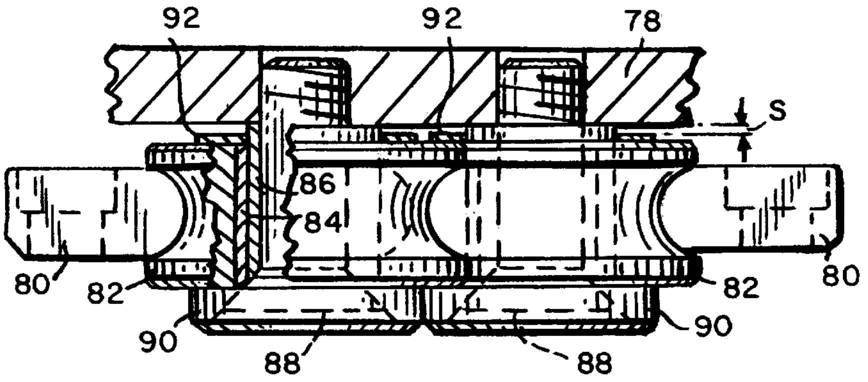

In the embodiment shown in FIGS. 15–17, the tray-shaped bottom 12 of the blade holder component 4 is carried on a plate 78, and the generally U-shaped base 28 is secured to the support component 16. Rails 80 are secured to the sides of the base. Pairs of rollers 82 are rotatably carried on the underside of plate 78. The rails 80 have convex sides received in concave rims of the rollers 82.

As can best be seen in FIG. 17, the rollers 82 are preferably provided with wear resistant sleeve inserts 84 journalled for rotation on spacer sleeves 86. The sleeves 86 are held in an abutting relationship against the underside of plate 78 by machine screws 88 and outer thrust washers 90. Inner thrust washers 92 are interposed between the rollers 82 and the plate 78. The axial length of the spacer sleeves 86 is greater than the combined axial thickness of the rollers 82 and inner thrust washers 92, thus providing a space S (exaggerated for purposes of illustration) which allows the rollers to shift axially and to self align themselves with the rails 80 with which they are in rolling contact and mechanical interengagement.

As can best be seen in FIG. 16, gaps 94 are provided between the rails 80, and filler blocks 96 occupy the spaces between the rollers 82. The lengths of the rails 80 are sufficient to support and guide the blade holder during its reciprocal movement, and the gaps 94 allow the blade holder to be lifted laterally and removed from the base 28 for repair and maintenance purposes. This is to be contrasted to the arrangement shown, for example, in FIGS. 1–3 where the rails 30 extend continuously, thus requiring the blade holder to be extracted and reinserted longitudinally from the side of the machine.

Figure 18:
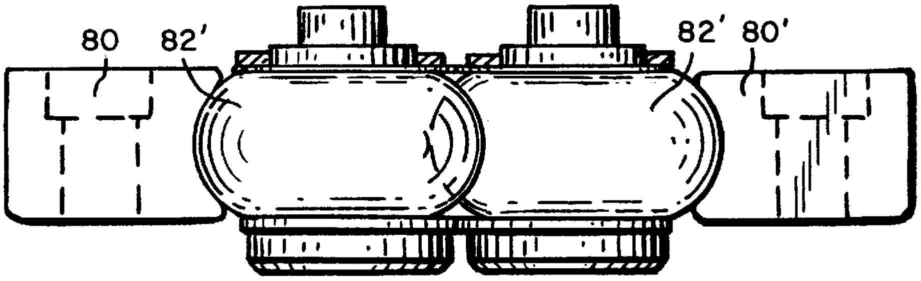

As shown in FIG. 18, the shapes of the rollers 82' and guide rails 80' can be reversed from that shown in FIGS. 15–17, i.e., the rails may have concave surfaces and the rollers may have convex rims.

In light of the foregoing, it will now be apparent to those skilled in the art that the present invention offers a number of significant advantages as compared to known prior art arrangements. For example, less than three guide rollers are required at positions spaced out over the length of the blade holder. The guide rollers coact in both rolling contact and mechanical interengagement with complimentary surfaces of adjacent guide rails. The rolling contact accommodates reciprocal movement of the blade holder component relative to the doctor back component while also resisting reactionary thrust forces. The mechanical interengagement serves to resist reactionary rotational forces. The rollers are preferably shiftable axially to provide self alignment with the rails with which they are in rolling contact and mechanical interengagement. Self alignment is further enhanced by providing the rollers and guide rails with curved contact surfaces, as shown in FIGS. 15–18. Any of the various types of known blade holders may be accommodated with this arrangement. The doctor blade may be applied to the surface to be doctored with a force generated by means carried on the blade holder, e.g., the fluid actuated tubes 14, 15 shown in FIG. 2. This makes it possible to eliminate and/or greatly simplify other costly components conventionally employed to apply and oscillate the doctor blade.

I claim:

1. Apparatus for doctoring a moving surface, said apparatus comprising:

a blade holder component extending longitudinally across said moving surface and carrying a doctor blade;

a support component parallel to and supporting said blade holder component;

first operating means for rotatably urging said doctor blade in one direction into contact with said moving surface, resulting in said doctor blade being acted upon by a reactionary thrust force in the plane of said doctor blade and a reactionary rotational force in a direction opposite to said one direction;

guide rails defining parallel tracks on one of said components;

rotatable rollers carried on and spaced along the length of the other of said components, each of said rollers being axially shiftable with respect to and in rolling contact and mechanical interengagement with a guide rail on a respective one but not the other of said tracks at a profiled interface, the profiled interfaces between said rollers and said guide rails being configured to accommodate reciprocal movement of said blade holder component relative to said support component, and to resist both said reactionary thrust force and said reactionary rotational force; and second operating means for reciprocally moving said blade holder component relative to said support component.

2. The apparatus as claimed in claim 1 wherein said profiled interfaces are curved.

3. The apparatus of claim 2 wherein said profiled interfaces are defined by concave surfaces on the rims of said rollers and convex surfaces on said rails.

4. The apparatus as claimed in claim 2 wherein said profiled interfaces are defined by convex surfaces on the rims of said rollers and convex surfaces on said rails.

5. The apparatus as claimed in claim 1 wherein said rollers have angularly configured rims in rolling contact and in mechanical interengagement with mating angularly disposed surfaces on said guide rails.

6. The apparatus of claim 5 wherein said angularly disposed surfaces define grooves extending in the direction of reciprocal movement of said blade holder component, and wherein said angularly configured rims project into said grooves.

7. The apparatus of claim 5 wherein said angularly configured rims define circular grooves, and wherein said angularly disposed surfaces project into said grooves.

8. The apparatus of claim 1 wherein said rollers are grouped in pairs mounted on said blade holder component at spaced intervals along the length thereof, and said guide rails are mounted on said support component.

9. The apparatus of claim 1 wherein said rollers are grouped in pairs mounted on said support component at spaced intervals extending along the length thereof, and said guide rails are mounted on said blade holder component.

10. The apparatus of claims 8 or 9 wherein the rotational axes of the rollers of each pairs are offset in the direction of the length of the component on which said rollers are mounted.

11. Apparatus for doctoring a moving surface, said apparatus comprising:

a blade holder component extending longitudinally across said moving surface and carrying a doctor blade;

a support component parallel to and supporting said blade holder component;

first operating means for rotatably urging said doctor blade in one direction into contact with said moving surface, resulting in said doctor blade being acted upon by a reactionary thrust force in the place of said doctor blade and a reactionary rotational force in a direction opposite to said one direction;

guide rails defining parallel tracks on said blade holder component;

rotatable rollers grouped in pairs and carried on and spaced along the length of said support component, each of said rollers being in rolling contact and in mechanical interengagement with a guide rail on a respective one but not the other of said tracks at a profiled interface, the profiled interfaces between said rollers and said guide rails being configured to accommodate reciprocal movement of said blade holder component relative to said support component, and to resist both said reactionary thrust force and said reactionary rotational force; and second operating means for reciprocally moving said blade holder component relative to said support component.

12. Apparatus for doctoring a moving surface, said apparatus comprising:

a longitudinally extending rail having a generally U-shaped cross section with bottom and upstanding side walls defining a guide channel;

means for securing said rail to a support in a position extending across a moving surface to be doctored;

a blade holder extending longitudinally and in parallel relationship to said rail;

rotatable rollers on said blade holder, each of said rollers projecting into said guide channel and being axially shiftable with respect to and in rolling contact and mechanical interengagement with one but not the other of said side walls at a profiled interface, the profiled interfaces between said rollers and said side walls being configured such that said rolling contact accommodates reciprocal movement of said blade holder relative to and along the length of said rail, and said mechanical interengagement resists movement of said blade holder in directions transverse to the length of said rail;

a doctor blade supported by said blade holder for application to said moving surface; and operating means for imparting said reciprocal movement to said blade holder.

13. The apparatus as claimed in claim 12 wherein said profiled interfaces are curved.

14. The apparatus as claimed in claim 13 wherein said profiled interfaces are defined by concave grooves in the rims of said rollers and convex tracks on the side walls of said rail.

15. The apparatus as claimed in claim 13 wherein said rollers have convex rims received in concave grooves in the side walls of said rail.

16. The apparatus as claimed in claim 12 wherein said rollers have angularly profiled rims in rolling contact and in mechanical interengagement with mating angularly disposed surfaces on the side walls of said rail.

17. The apparatus of claim 16 wherein said angularly disposed surfaces define grooves extending in the direction of said guide channel, and wherein said angularly profiled rims project into said grooves.

18. The apparatus of claim 16 wherein said angularly profiled rims define circular grooves, and wherein said angularly disposed surfaces project into said grooves.

19. The apparatus of claim 16 wherein said rollers are grouped in pairs located at spaced intervals along the length of said blade holder.

20. The apparatus of claim 19 wherein the rotational axes of the rollers of each pair are offset in the direction of the length of said guide channel.

21. The apparatus of claims 1 or 12 further comprising filler blocks occupying the spaces between said pairs of rollers.

22. The apparatus of claim 12 further comprising sealing means for resisting penetration of external contaminants into said guide channel.

23. Apparatus for doctoring a moving surface, said apparatus comprising:

a longitudinally extending rail having a generally U-shaped cross section with bottom and upstanding side walls defining a guide channel;

means for securing said rail to a support in a position extending across a moving surface to be doctored;

a blade holder extending longitudinally and in parallel relationship to said rail;

rotatable rollers grouped in pairs and spaced along the length of said blade holder, each of said rollers projecting into said guide channel and being in rolling contact and in mechanical interengagement with one but not the other of said side walls at a profiled interface, the profiled interfaces between said rollers and said side walls being configured such that said rolling contact accommodates reciprocal movement of said blade holder relative to and along the length of said rail, and said mechanical interengagement resists movement of said blade holder in directions transverse to the length of said rail;

filler blocks occupying the spaces between said pairs of rollers;

a doctor blade supported by said blade holder for application to said moving surface; and operating means for imparting said reciprocal movement to said blade holder.

24. Apparatus for doctoring a moving surface, said apparatus comprising:

a longitudinally extending rail having a generally U-shaped cross section with bottom and upstanding side walls defining a guide channel;

means for securing said rail to a support in a position extending across a moving surface to be doctored;

a blade holder extending longitudinally and in parallel relationship to said rail;

rotatable rollers grouped in pairs and spaced along the length of said blade holder, the rotational axes of the rollers of each pair being offset in the direction of the length of said guide channel, each of said rollers projecting into said guide channel and having angularly profiled rims being in rolling contact and in mechanical interengagement with mating angularly disposed surfaces on one but not the other of said side walls at a profiled interface, the angularly profiled interfaces between said rollers and said side walls being configured such that said rolling contact accommodates reciprocal movement of said blade holder relative to and along the length of said rail, and said mechanical interengagement resists movement of said blade holder in directions transverse to the length of said rail;

filler blocks occupying the spaces between said pairs of rollers;

a doctor blade supported by said blade holder for application to said moving surface; and operating means for imparting said reciprocal movement to said blade holder.

25. Apparatus for doctoring a moving surface, said apparatus comprising:

a blade holder component extending longitudinally across said moving surface and carrying a doctor blade;

a support component parallel to and supporting said blade holder component;

first operating means for rotatably urging said doctor blade in one direction into contact with said moving surface, resulting in said doctor blade being acted upon by a reactionary thrust force in the place of said doctor blade and a reactionary rotational force in a direction opposite to said one direction;

guide rails defining parallel tracks on said support component;

rotatable rollers carried on and grouped in pairs spaced at intervals along the length of said blade holder component, the rotational axes of the rollers of each said pairs being offset in the direction of length of said blade holder component, each of said rollers being in rolling contact and in mechanical interengagement with a guide rail on a respective one but not the other of said tracks at a profiled interface, the profiled interfaces between said rollers and said guide rails being configured to accommodate reciprocal movement of said blade holder component relative to said support component, and to resist both said reactionary thrust force and said reactionary rotational force; and second operating means for reciprocally moving said blade holder component relative to said support component.

* * * * *